United States Patent [19]

McGinnis et al.

[11] 3,825,993
[45] July 30, 1974

[54] METHOD OF PROVIDING ARTICLE FROM CLAD ALUMINUM BASE ALLOY

[75] Inventors: Michael K. McGinnis, Lower Burrell; Paul F. Wallace, New Kensington, both of Pa.

[73] Assignee: Aluminum Company of America, Pittsburgh, Pa.

[22] Filed: July 6, 1972

[21] Appl. No.: 269,475

Related U.S. Application Data

[60] Division of Ser. No. 147,624, May 27, 1971, abandoned, which is a continuation of Ser. No. 787,523, Dec. 27, 1968, abandoned.

[52] U.S. Cl.............. 29/472.9, 29/195, 29/527.2, 29/527.4, 113/120 CC
[51] Int. Cl............................................ B23k 31/02
[58] Field of Search ....... 29/470, 472.3, 472.9, 484, 29/195 V, 195 P, 480, 527.2, 527.4; 113/120 CC

[56] References Cited
UNITED STATES PATENTS

| | | | |
|---|---|---|---|
| 2,470,593 | 5/1949 | Webb et al................... | 113/120 CC |
| 3,235,961 | 2/1966 | Champion et al................ | 29/195 P |
| 3,290,129 | 12/1966 | Nock, Jr. et al.................. | 29/196.2 |
| 3,377,145 | 4/1968 | Wallace et al.................... | 29/195 V |
| 3,400,450 | 9/1968 | Nock, Jr. et al.................. | 29/497.5 |
| 3,421,972 | 1/1969 | Cromwell et al................. | 29/195 P |
| 3,482,951 | 12/1969 | Hubbell et al..................... | 29/195 V |
| 3,595,631 | 7/1971 | Broverman........................ | 29/197.5 |

FOREIGN PATENTS OR APPLICATIONS

| | | | |
|---|---|---|---|
| 540,822 | 5/1957 | Canada............................. | 29/197.5 |

*Primary Examiner*—Richard B. Lazarus
*Attorney, Agent, or Firm*—Abram W. Hatcher

[57] ABSTRACT

A composite clad sheet product made up of an aluminum base alloy containing about 2.5 to 6% zinc, about 0.4 to 3% magnesium, about 0.2 to 1% manganese, and balance essentially aluminum, clad with a magnesium-free aluminum base alloy containing about 0.5 to 1.8% manganese. The product may have an outside porcelain enamel finish and an inside cured organic resin finish and be in the form of a cooking utensil.

2 Claims, 1 Drawing Figure

PATENTED JUL 30 1974 3,825,993
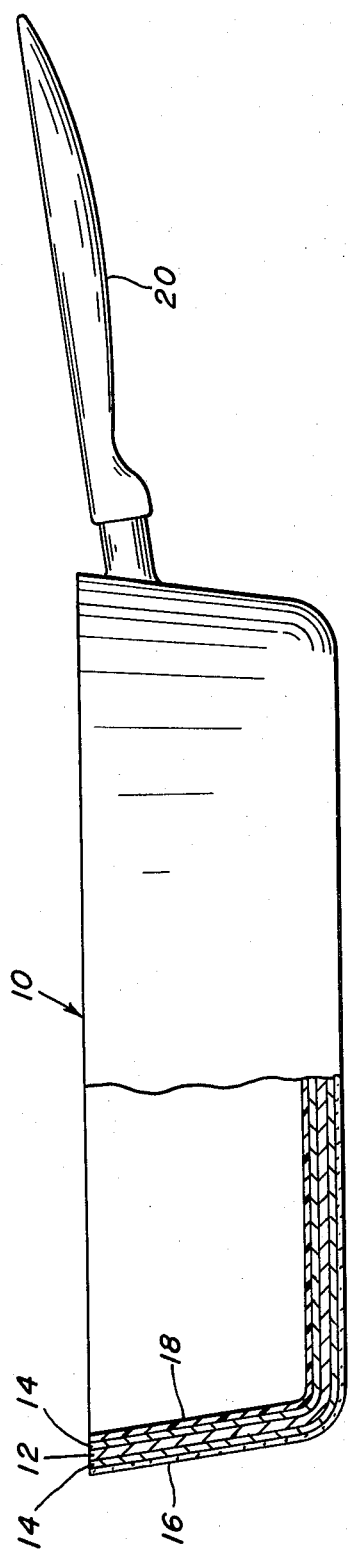

METHOD OF PROVIDING ARTICLE FROM CLAD ALUMINUM BASE ALLOY

This application is a division of application Ser. No. 147,624 filed May 27, 1971, now abandoned, which is a continuation of application Ser. No. 787,523 filed Dec. 27, 1968 now abandoned. A continuation of Ser. No. 147,624 has issued and is now U.S. Pat. No. 3,773,477, issued Nov. 20, 1973.

BACKGROUND OF THE INVENTION

This invention relates to a composite clad sheet product made up of an aluminum base alloy core clad with another aluminum base alloy. More particularly, it involves a clad aluminum base alloy composite sheet which will form a highly satisfactory host for a vitreous enamel coating on one side and a high temperature curable organic resin coating on the other side.

A continuing problem in the aluminum industry has been the finding of an aluminum base alloy product that will retain high mechanical strength when subjected to the elevated temperatures required to apply finishes such as vitreous enamels and heat-curing resinous finishes. Such a product must not only retain its strength after finishing heating cycles but must also be a satisfactory host for finishes. To be commercially useful, the finishes must not only adhere when applied but must continue to adhere during constant use. Furthermore, such products must be capable of being fabricated without having forming defects such as those commonly known as earing, roping and the like.

It is known that one way of improving the strength of aluminum sheet is by means of solution heat treatment. Such heat treatment may be effected at the temperatures normally required to apply vitreous enamel and heat-curing resinous coatings. However, aluminum base alloys that are responsive to heat treatment at these temperatures are not the best hosts for vitreous finishes. Cladding alloys are known which will provide satisfactory host surfaces on a heat-treatable, strong alloy core. However, until now a firmly-bonded core-cladding combination has not been found which will provide the desired high strength and dent resistance when subjected to the heating cycles required for finishing while at the same time furnishing a satisfactory host for the finishes, and which will additionally be substantially free from forming defects such as earing, roping and the like.

Clad products such as those of U.S. Pat. Nos. 3,377,145 are satisfactory for providing moderate strength when coated with vitreous enamel. However, such products are not satisfactory for cooking utensil use. The reason is that when coated on one side with vitreous enamel requiring heating at about 900° to 1,050°F. and on the other with a resinous coating curable at about 675° to 850°F., they tend to lose their strength and dent resistance. Furthermore, they cannot withstand drawing or the like without exhibiting the above-mentioned defects such as earing, roping and the like, nor will they have the required integrity of bond between cladding and core. While for known clad alloys the enamelling temperature improves strength by amounting to solution heat treatment, the lower finish-curing temperature generally acts as an anneal, thereby limiting the strength of the finished product.

SUMMARY OF THE INVENTION

It is accordingly an object of this invention to provide an improved clad aluminum base alloy composite sheet product. A further object is to provide an aluminum clad sheet composite product which profits by, rather than being detrimentally affected by, thermal exposure such as that encountered during enamelling and resin coating to form a houseware product. Still another object is to provide a clad product which is of high strength after surface finishing on one side with porcelain enamel fired at 950° to 1,050°F. and on the other side with an organic resin coating which requires curing at a temperature of about 675° to 850°F., for example, polymers of halogenated ethylene or of halogenated propylene, silicones, polyimides and the like. A further object is to provide a clad product which can be formed into useful articles devoid of forming defects such as earing, roping and the like. Still another object is to provide a clad product having cladding bonded securely to core and an integrity of bond between cladding and core unaffected by heating used to apply vitreous enamels thereto and to cure resinous coatings thereon and by subsequent conditions of use. These and other objects will be apparent from the description and claims which follow.

Our invention is predicated upon the discovery that an improved aluminum base alloy clad product can be obtained by using a core made up of about 2.5 to 6% by weight zinc, about 0.4 to 3% by weight magnesium, and about 0.2 to 1% by weight manganese as essential alloying components and balance essentially aluminum, and a magnesium-free aluminum base alloy cladding on at least one side of the core made up of about 0.5 to 1.8% by weight manganese as the essential alloying component and balance essentially aluminum. Magnesium may be present in the cladding as an impurity, but the amount should not exceed about 0.005%. According to one embodiment of our invention, the clad core may have a vitreous enamel applied on at least one side over the surface of the cladding and may be in the form of a cooking utensil with the cladding on both the outside and the inside, a vitreous enamel coating applied to the external or outer surface of the outside cladding and a coating of a heat-curable organic resin on the internal surface of the inside cladding. The heat-curable organic resin may be, for example, a polyimide, a polymer of a halogenated ethylene or a halogenated propylene such as polytetrafluoroethylene or a silicone. We have found surprisingly that the thermal exposure to which the clad core composite sheet of our invention is subjected during fusion or curing of the finishes, normally deleterious when used on other alloys or alloy combinations, somehow actually serves as a beneficial heat treatment, for example, in improving the strength and dent resistance or the like of the finished product.

The core alloy may contain small amounts of the usual silicon and iron and the like impurities, for example, in percent by weight up to about 0.5% of each. There may also be present up to about 0.5% chromium, up to about 0.1% titanium or boron, and up to about 0.25% copper, or the like. To achieve the results set out hereinabove, however, the total amount of elements other than aluminum, zinc, magnesium, and manganese in the core alloy should not exceed about 2%. The magnesium-free aluminum base cladding alloy may also contain small amounts of silicon and iron and other elements except magnesium not exceeding about 1%, that is, up to about 0.1% of each. As mentioned above, the amount of magnesium must not be greater than 0.005%. Preferably, the cladding alloy should contain in percent by weight not more than about 0.15% copper and not more than about 0.25% zinc.

Using a clad aluminum base alloy composite of the kind described hereinabove, the heating incident to the resin curing operation, which may be by fusion or cross-linking and is commonly referred to as baking, is actually beneficial to the strength and dent-resistance of the clad sheet composite product formed.

The aluminum clad sheet composite of our invention may be fashioned by known rolling techniques or procedures. For example, the cladding may be applied to the core alloy by hot rolling. The clad sheet may then be formed into useful articles by known forming methods.

BRIEF DESCRIPTION OF THE DRAWING

For a better understanding of our invention, reference will now be made to the attached drawing, which is illustrative of one embodiment of our invention.

In the drawing, broken away in part to illustrate layers, clad cooking utensil product 10 consists of an aluminum-zinc-magnesium-manganese alloy core 12 clad on both sides with an aluminum-manganese alloy cladding 14 and coated on the outside with a vitreous enamel finish 16 and on the inside with a polytetrafluoroethylene or like heat-curable organic resin 18. The utensil 10 may be provided with a handle 20, which may be of wood, metal, plastic, or the like.

DESCRIPTION OF THE PREFERRED EMBODIMENTS

The following examples are illustrative of our invention.

EXAMPLE 1

A clad product was prepared having as the core an aluminum base alloy nominally composed of aluminum, 4.5% zinc, 1.5% magnesium, 0.35% silicon, 0.35% iron, 0.10% copper, 0.3% manganese and 0.02% titanium. A cladding of a magnesium-free aluminum 1.2% manganese alloy was roll bonded to the core in accordance with commercial practice. The clad product was rolled to sheet having a thickness of 0.025 inch, the cladding being 0.0025 inch in thickness on each side. Samples were taken from the sheet and degreased. A commercial pigmented vitreous enamel slip was applied to the clad surface. The samples were heated in an oven to 1,000°F., held at that temperature for 10 minutes, withdrawn from the oven and cooled to room temperature in air. To accentuate the effects of diffusing elements into the cladding, the samples were reheated in the same manner and cooled and the cycle repeated a third time. The samples were then examined for spalling, shearing off, or breaking away of the porcelain enamel according to the standard test described in ASTM C 486. Substantially no spalling was detected.

EXAMPLE 2

The procedure of Example 1 was followed except that the cladding was only about 0.0015 inch in thickness. Again, no spalling or chipping away of the vitreous enamel was detected.

EXAMPLE 3

The clad product of Example 2 before enamelling was drawn into the form of a deep pan cooking utensil. Vitreous enamel was then applied to the outer surface and the utensil heated to 1,000°F. for 10 minutes and cooled under ambient conditions. The finish was substantially uniform in appearance and bright in color. Afterwards, the inner surface was finished with a smooth non-sticking polytetrafluoroethylene coating which was baked on at 750°F. prior to natural cooling under ambient conditions. The finished product was substantially dent resistant and had high mechanical strength. Additional samples given the above-mentioned double heating cycle had high strength and dent resistance and retained substantially all of the high strength and dent resistance when subsequently heated to temperatures such as ordinarily encountered during cooking of foods in such a utensil.

While the invention has been described in terms of preferred embodiments, the claims appended hereto are intended to encompass all embodiments which fall within the spirit of the invention.

Having thus described our invention and certain embodiments thereof, we claim:

1. In the art of providing an enamelled aluminum base alloy article, the steps of cladding both sides of an aluminum base alloy core member having as essential components from about 2.5 to about 6% by weight zinc, from about 0.4 to about 3% by weight magnesium, from about 0.2 to about 1% by weight manganese, and balance essentially aluminum with a magnesium-free aluminum base alloy having as the essential alloying component from about 0.5 to about 1.8% by weight manganese and balance essentially aluminum, drawing the clad core member into the shape of a cooking utensil having an outer and inner surface, applying vitreous enamel to the outer surface of said cooking utensil, heating said cooking utensil having the vitreous enamel applied to its outer surface at a temperature of from about 900° F. to about 1,050° F. without causing it to lose strength and dent resistance, cooling same, coating the inner surface with a heat-curable organic resin and curing said resin on said inner surface by heating at a temperature of from about 675° F. to about 850° F., and again cooling said cooking utensil, all of said steps being performed with substantially no earing or roping.

2. The process of claim 1 wherein the resin is a polymer of halogenated ethylene.

* * * * *